United States Patent [19]
Brun et al.

[11] 3,838,776
[45] Oct. 1, 1974

[54] SEMI-PERMEABLE MEMBRANE APPARATUS

[75] Inventors: Robert Brun, Saint Pierre De Senos-Bollene; Michel Pages, Saint Martin D'Ardeche, both of France

[73] Assignee: Rhone-Poulenc S.A., Paris, France

[22] Filed: June 2, 1972

[21] Appl. No.: 258,995

[30] Foreign Application Priority Data
June 7, 1971 France .......................... 71.20504

[52] U.S. Cl. ............................. 210/321, 210/456
[51] Int. Cl. ......................................... B01d 31/00
[58] Field of Search .......................... 210/321, 456

[56] References Cited
UNITED STATES PATENTS
3,246,764   4/1966   McCormack ................... 210/321
3,503,515   3/1970   Tomsic ............................ 210/321
3,598,728   8/1971   Bixler et al. ..................... 210/22

Primary Examiner—Frank A. Spear, Jr.
Attorney, Agent, or Firm—Cushman, Darby & Cushman

[57] ABSTRACT

Apparatus for high pressure reverse osmosis or ultrafiltration comprising a bundle of porous tubes each with a semi-permeable membrane covering for fluid flow therethrough into the tubes. A leakproof high-pressure container for the tubes has packing material therein.

6 Claims, 3 Drawing Figures

SEMI-PERMEABLE MEMBRANE APPARATUS

The present invention relates to semi-permeable membrane apparatus. It relates more particularly to an apparatus for the purification or the separation of liquids, especially by osmosis, inverse osmosis, filtration, ultrafiltration or hyperfiltration.

According to the present invention, there is provided apparatus for separating the constituents of a liquid comprising a plurality of substantially parallel porous tubular supports, each having a semi-permeable membrane externally thereon arranged inside a leakproof chamber for flow of liquid therearound, an outlet for fluid which has diffused across said membranes, and a packing material extending around the tubular supports inside the said chamber.

According to another aspect of the present invention, there is provided a method of separating the constituents of a liquid comprising osmosis, inverse osmosis, filtration, ultrafiltration or hyperfiltration using apparatus according to the invention.

The apparatuses of known type, such as that described for example in French Pat. No. 1,585,386, contain a space between the inside of the leakproof chamber and the outside of the membrane tubular supports, bounded by two side plates. Generally, the solution to be treated travels in this space in contact with the membranes, between the inlet and outlet orifices located on the wall of the chamber at opposite ends.

According to the invention, this space contains a packing material. This causes only a slight increase in pressure drop relative to apparatus without this packing material. It might be feared that a packing material arranged around the membrane-covered tubes of a bundle would give rise to many disadvantages: for example, by direct contact with the membranes, to decrease the surface area usable for exchange; thus to be an obstacle to the flow of the liquid across the membranes, and so to decrease its flow rate and thus the yield of the apparatus; to travel and become deformed inside the bundle, the fibres presenting the risk of piercing the membranes. Experience has shown that these various disadvantages can easily be overcome and that, surprisingly, on the contrary, the presence of the packing material substantially increases the efficiency of the apparatus. It is assumed that it produces conditions of turbulent flow along the length of the membranes.

The packing material may occupy an apparent volume of between 30 percent and 100 percent of the total volume available, and preferably between 70 percent and 95 percent, because it is advantageous to keep the orifices of the pipelines for the introduction and removal of the liquid to be treated free. The presence of a packing material in a volume which is less than 30 percent of the space available around the tubular supports is only of limited value.

The packing material is chosen so that, in general, it increases the pressure drop by only 1 percent to 50 percent, and preferably by 2 percent to 10 percent, relative to an apparatus which is not equipped with the packing material. In practice, the increase in pressure drop remains low: for example, for water, this increase is usually less than 1 bar and very often less than 0.5 bar. Hereafter, the ratio of the pressure drop caused, under defined conditions, by the apparatus equipped with a packing material according to the invention to that caused, under the same conditions, by the nonequipped apparatus will be described as the coefficient of pressure drop. This coefficient is between 1.01 and 1.5 and preferably between 1.02 and 1.10.

A larger coefficient of pressure drop, generally corresponding to a packing material with a very tight structure with finer or more closed cells, would lead to a poor flow of the treated fluid in contact with the membranes. Higher pressures would then have to be employed. They would present the risk of causing, during alterations in operation, large mechanical stresses on the packing material and of moving it and compressing it inside the apparatus.

A smaller coefficient of pressure drop, generally corresponding to a packing material with a very open and very spaced-out structure with large cells, would require, for example, hard fibres in order to give the assembly sufficient rigidity: the ends of hard fibres would then present the risk of piercing the membranes in contact with them. Furthermore, this type of packing would give rise to decreased efficiency.

It is often advantageous to arrange a packing with a relatively high coefficient of pressure drop at the periphery of the apparatus and a packing with a smaller coefficient of pressure drop at the centre of the apparatus, between the tubular supports. Such a result can easily be achieved, for example, by compressing one and the same type of packing material to a different extent at the centre and at the periphery of the apparatus.

As packing materials, it is possible to use granules or balls, for example of material such as polyolefines, polyamides and glass. It is preferable, however, to use porous and coherent materials, for example, an assembly made up of filaments and/or of fibres which are intertwined or connected to one another to form the edges of open polygonal cells.

A material with a fibrous structure can be used, the intertwined fibres of which form sufficiently loose meshes.

It is also possible to use a crimped lattice made of synthetic material or a fabric of glass fibres.

It is possible to use in principle a foam with open cells, which is rigid, semi-rigid or preferably flexible. A flexible foam is preferably used with cells which have been burst and reticulated, for example, according to the techniques described in U.S. Pat. No. 3,475,525.

The material of which the packing component is made is chosen from amongst those which possess sufficient resistance to possible chemical attacks due to the solutions treated, for example, for its resistance to hydrolysis in the case of the treatment of water. It is also chosen as a function of its mechanical strength and its resistance to aging. The nature of the filaments and/or fibres and their arrangement relative to the membranes must avoid their piercing or tearing the membranes locally.

In the case of the purification of water starting from sea water, brackish water or water containing calcium salts, it is possible to use polyurethane foams derived from polyesters, or preferably from polyethers. It is also possible to use polyvinyl chloride foams or foams made of any other material which is sufficiently flexible and strong.

In order that the invention may be more clearly understood the following description is given, merely by way of example, reference being made to the accompanying drawings, in which.

Figure 1:
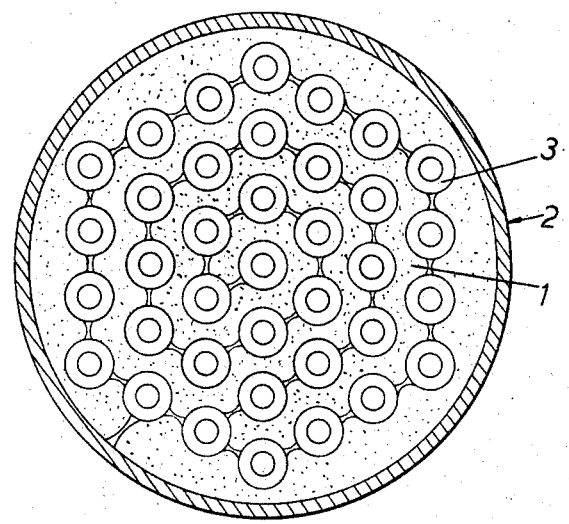
FIG. 1 is a cross-sectional view transverse of the tubes, of one embodiment of the apparatus.

There has been shown in FIG. 1 an apparatus consisting of a bundle of tubes, inside which the membranes are arranged on the outside of tubular porous supports. A packing material 1 is arranged in a part of the volume contained inside the chamber 2, around the tubular supports 3.

According to a first embodiment, this packing material can consist, for example, of one or more plates of flexible foam with open cells. These plates can be introduced firstly between the tubular supports and the cylindrical wall of the chamber, and secondly between the tubular supports themselves, for example, by rolling them up in a spiral from the axis of the bundle to its periphery. It is advantageous to arrange the packing material longitudinally from one side plate to the other, leaving free the regions situated in the vicinity of the pipes for the introduction and removal of the solution to be treated.

Figure 2:
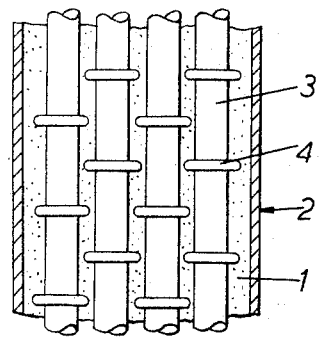
FIG. 2 is a partial longitudinal section of another embodiment of the apparatus.

According to another embodiment, shown in FIG. 2, it is possible to replace a part of the packing material such as that shown in FIG. 1, by a series of coaxial rings 4 arranged around each porous tubular support covered with a membrane. These rings are arranged in a quincunx relative to the rings equipping the neighbouring tubular supports. These rings preferably extend up to the neighbouring tubes. They are arranged at intervals which are usually between 5 and 50 cm and preferably between 10 and 20 cm. Thus they form a system of baffles. As rings, it is preferable to use toroid gaskets, the dimensions of which correspond to the diameters of the porous supports, so that they are held tightly on these supports.

Figure 3:
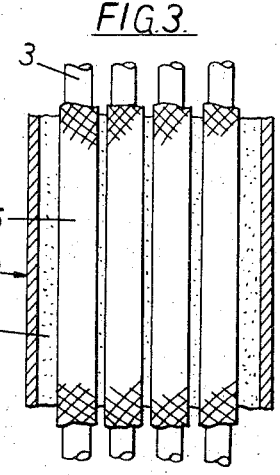
FIG. 3 is a view similar to FIG. 2 of another embodiment of the apparatus.

According to another embodiment, shown in FIG. 3, the rings 4 are replaced by nets 5. These can be in the form of a tubular sheath, for example of contractable thermo-plastic material, which is inserted around each support. The positioning can be facilitated by using, as a variant, nets in the form of strips one of which is wound in a helix around each support.

These various embodiments allow an efficiency to be obtained which is comparable to that obtained with a single packing material.

The use of a packing material gives, as its principal advantage, an increase in the flow rate of the permeating liquid, as can be illustrated by the following comparative Example:

EXAMPLE

Sea water containing 35 g/l of sodium chloride is desalinated by inverse osmosis.

To do this, an apparatus is used such as that described in French Pat. No. 1,585,386.

It contains a bundle of 37 porous tubes of internal diameter 7 mm/external diameter 18 mm, coated on the outside with semi-permeable membranes of cellulose acetate prepared according to U.S. Pat. No. 3,344,214, over a usable length of 1,100 mm.

This bundle is located inside a chamber of internal diameter 160 mm.

a. In a first experiment, the space contained inside the chamber, around the tubes of the bundle, is free.

This space is traversed by 1,500 l/hour of sea water, under a pressure of 60 bars.

The rate of flow of desalinated water which has passed through the membranes settles at: $Q_1 = 17.2$ litres/hour b. In a second experiment, with all the other conditions remaining the same, 90 percent of the space contained inside the chamber around the tubes of the bundle is filled with a flexible foam with burst cells made of polyurethane from polyether, of apparent specific gravity 0.03, possessing 175 pores/dm. The coefficient of pressure drop of this material is equal to 1.05 under the conditions of the experiment.

Under these conditions, the rate of flow of desalinated water which has passed through the membranes settles at:

$$Q_2 = 20.6 \text{ litres/hour.}$$

It is thus found that the packing used increases the separation efficiency of the apparatus by about 20 percent.

However, in general terms, the use of packing materials according to the invention offers other advantages as well. For example, the rate of flow of the treated water in the chamber is found to be regularised, in particular with the elimination of dead regions. Furthermore, in certain applications, a decrease in the amount of scale in the chamber of the apparatus is found. Furthermore, it is observed that these advantages are obtained at the cost of an extremely small pressure drop, generally less than 0.5 or 1 bar, that is to say, less than a few per cent of the pressure to which the treated liquid is subjected.

We claim:

1. In an apparatus for the separation of the constituents of a liquid, comprising a bundle of tubular parallel supports, each covered at least exteriorly by semipermeable membrane and disposed in the interior of a fluid tight chamber for the circulation of fluids to be treated; a packing material disposed in the interior of said chamber and around the said tubular supports, and means for the recovery of the fluid having diffused through the said membranes, the improvement which consists in utilising as a packing material a porous, coherent flexible material.

2. An apparatus according to claim 1, the improvement which consists in utilising as the packing material a flexible open cell foam.

3. An apparatus according to claim 1, the improvement which consists in utilizing as the packing material a flexible foam with burst cells.

4. An apparatus according to claim 1, the further improvement which consists in disposing over the length of each tubular support a series of regular coaxial rings, the rings of adjacent supports being spaced from one another.

5. An apparatus according to claim 1, the further improvement which consists in disposing a net around each tubular support.

6. An apparatus according to claim 1, wherein the minimum internal diameter of each tubular parallel support is about 7 mm.

* * * * *